Oct. 14, 1930.    L. DEUTSCH ET AL    1,778,210
FOUR-WAY VALVE PUMP
Filed Aug. 25, 1927    2 Sheets-Sheet 1
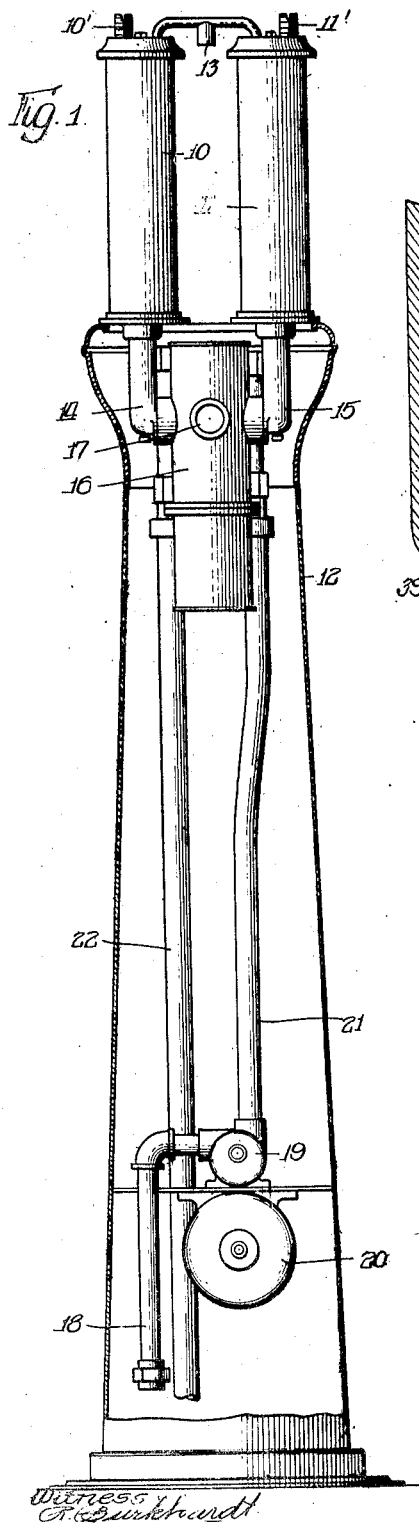
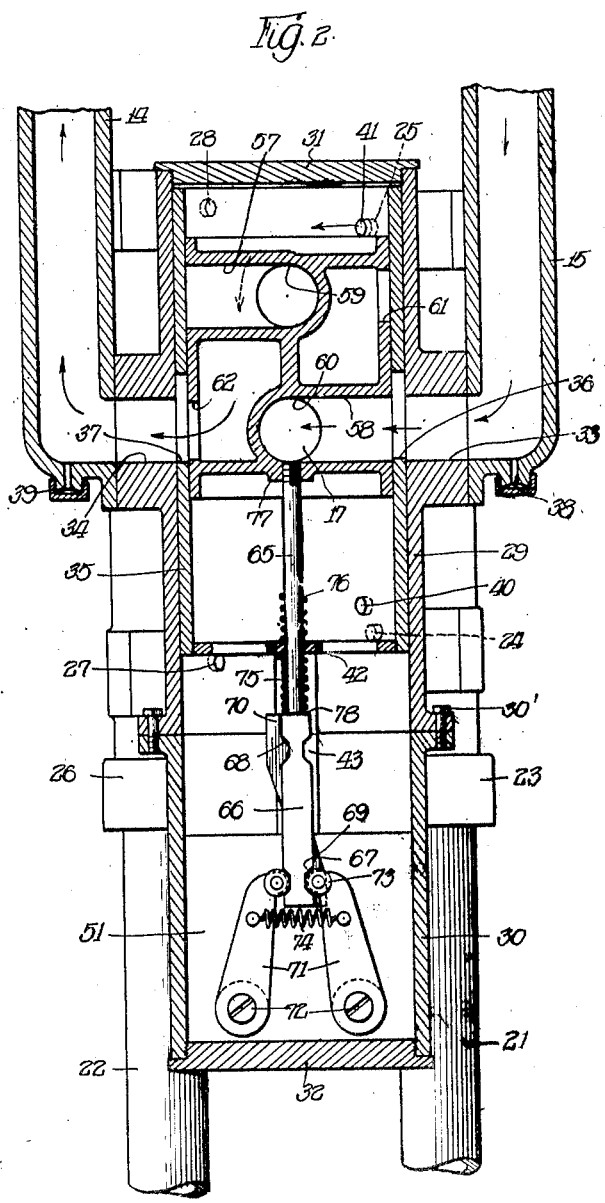
Inventors:
Leo Deutsch,
George J Gerung, Oct. 14, 1930.  L. DEUTSCH ET AL  1,778,210
FOUR-WAY VALVE PUMP
Filed Aug. 25, 1927   2 Sheets-Sheet 2
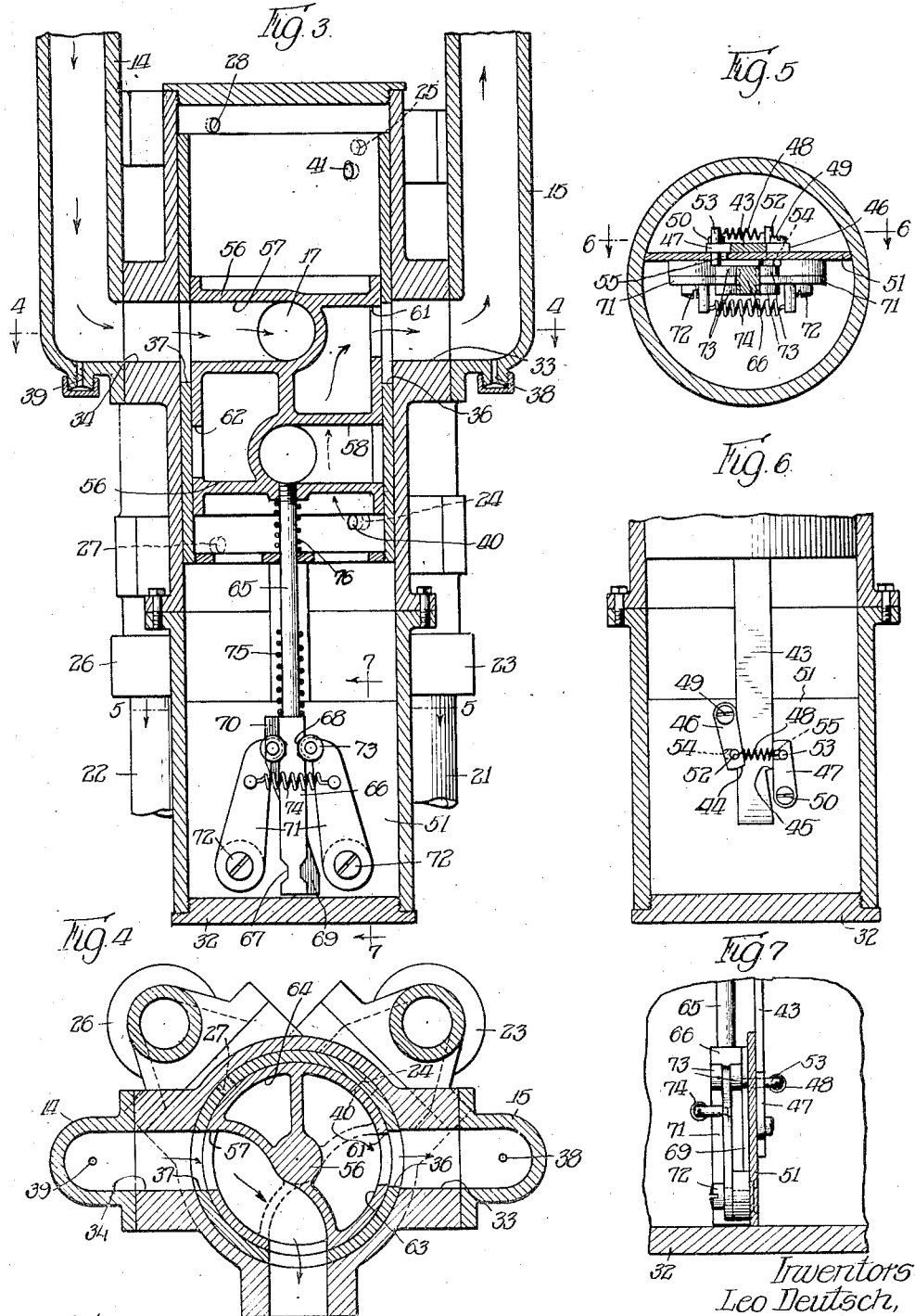

Patented Oct. 14, 1930

1,778,210

UNITED STATES PATENT OFFICE

LEO DEUTSCH, OF BEAVER, AND GEORGE J. GENUNG, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

FOUR-WAY-VALVE PUMP

Application filed August 25, 1927. Serial No. 215,300.

The invention pertains to fluid dispensing apparatus, and more particularly to valve mechanism for controlling the flow of fluid in dispensing apparatus.

It is an object of this invention to provide a simple, effective inexpensive and positive valve for controlling the flow of fluid in fluid dispensing apparatus.

Another object is to provide a multiple-way valve for automatically controlling the flow of fluid in a fluid dispensing apparatus.

Still another object is to provide a valve assembly of simplified construction to thereby eliminate a multiple number of valves in the automatic control of a fluid dispensing apparatus.

A further object is to provide a mechanical, pressure responsive and automatic control for a fluid dispensing apparatus.

Still further object is to provide control means for dispensing apparatus of the multiple container type to effect the automatic control thereof for continuous discharge, the means being so arranged as to accurately time the supply and discharge of the measuring means of said dispensing apparatus.

With these and various other objects in view, the invention consists of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a sectional elevation of dispensing apparatus of the super twin type, showing the relation of various parts thereof;

Figure 2 is an enlarged sectional elevation of the dispensing valve unit and certain associated parts;

Figure 3 is a similar view to Figure 2, showing the valve mechanism in position for discharging from a different measuring chamber;

Figure 4 is a sectional plan of the dispensing valve unit, taken substantially on the plane as indicated by the line 4—4 of Figure 3;

Figure 5 is a sectional plan taken through certain parts of the dispensing unit as viewed substantially on the plane as indicated by the line 5—5 of Figure 3;

Figure 6 is an enlarged fragmentary sectional elevation of certain parts of the valve unit, taken substantially on the plane as indicated by the line 6—6 of Figure 5; and Figure 7 is an enlarged fragmentary elevation of certain parts of the valve unit, taken substantially on the plane as indicated by the line 7—7 of Figure 3.

In a pump of the super twin type, measuring chambers 10 and 11 are provided and are suitably supported on a standard or casing 12, said measuring chambers being preferably connected at the top thereof by a suitable air conduit and vacuum breaker 13, it being understood that such measuring chambers are provided with the usual mechanism found on dispensing apparatus of this type, such as calibrating plugs 10' and 11' respectively. The measuring chambers are connected by means of suitable fittings or conduits 14 and 15 to the casing of the dispensing valve mechanism 16, said casing being provided with a suitable port 17 adapted to be connected to the usual draw-off and hose connections.

Any suitable source of supply may be provided, such source being connected to the dispensing apparatus through the pipe or conduit 18 connected to a pump 19 preferably driven by the motor 20, said pump being connected to the conduit 21 which is in communication with the dispensing valve unit. This unit is also connected to a pipe or conduit 22 for returning any overflow or excess fluid to the source of supply.

An inlet or pump manifold 23 is provided in communication with the casing 16, said manifold being connected to the conduit 21 and having communication with the casing through suitable ports 24 and 25. An overflow or return manifold 26 is provided in communication with the casing and the return conduit 22, said manifold having communication with the casing through suitable ports 27 and 28.

The dispensing unit casing may be conveniently made of a plurality of parts, such as a body 29 and a lower cup 30, said parts being suitably connected by any means such as the bolts 30', the assembly of the casing being completed by means of a cap 31 threaded or otherwise non-leakably secured to the body 29, and a cap or base 32 similarly secured to the cup 30. The body 29 is provided with ports 33 and 34 which are in communication with conduits 15 and 14, said conduits being provided with normally closed passages 38 and 39, which passages may serve as a communication with a suitably operated drain conduit (not shown). A sleeve 35 adapted for reciprocating motion is provided in the casing 16, said sleeve being provided with ports 36 and 37 adapted to register with the ports 33 and 34, and being provided with other ports 40 and 41 adapted to register with the ports 24 and 25. The bottom of the sleeve is provided with a spider 42, said spider being provided with a tongue or rod 43, said rod extending down and along the partition 51 preferably provided on the cup 30. This tongue is upwardly and downwardly notched at 44 and 45, said notches providing dog-engaging shoulders for the dogs 46 and 47 which are downwardly and upwardly pivoted at 49 and 50, said dogs being held in the notches and urged toward each other by means of a spring 48 connected thereto and disposed therebetween. These dogs 46 and 47 are provided with lugs or pins 52 and 53 which may form an anchorage for the spring 48, said pins being extended through the dogs and through slots 54 and 55 provided in way thereof in the partition 51.

Within the sleeve, there is provided a reciprocating piston 56, said piston being suitably ported and cored at 57 and 58, the cores terminating in ports 59 and 60 which are adapted to successively register with the ports 17 of the draw-off connection. This piston is also provided with ports 61 and 62 adapted to register with the ports 36 and 33, and 37 and 34 respectively, of the sleeve and casing. Suitable cores 63 are provided in the piston to provide a communication between the ports 24 and 40 through the piston and through the ports 61, 36 and 33 to the conduit 15. The piston is similarly cored at 65 to establish communication between the ports 25 and 41 through the piston and through ports 62, 37 and 34 to the conduit 14.

The piston is provided with a piston rod 65 which may be suitably threaded in the shoulder or boss 77, said piston rod being provided at its lower end with a member 66 suitably notched at 67 and 68, said member being provided with a spring engaging shoulder 78. Upwardly and downwardly sloping cams 69 and 70 are provided on opposite sides of the member 66 at the bottom and top thereof respectively, said cams being adapted to cooperate with the pins 52 and 53 respectively, to operate their respective pawls. Upwardly extending dogs 71 are pivoted at 72 to the partition 51, said dogs being provided with rollers or other antifriction means 73 adapted to cooperate with the notches provided in the member 66, said dogs being urged into said notches and toward each other by means of a spring 74 provided therebetween. Disposed around the piston rod 65 and between the shoulders 78 of the member 66 and the spider 42, there is a spring 75, and similarly disposed between the spider 42 and the boss 77 of the piston 56, there is a spring 76.

In the operation of the dispensing apparatus, assuming that the parts of the device are in the position shown in Figures 3 to 7 inclusive, when the motor 20 is started, fluid will be pumped through the conduit 18, through the pump 19, through the conduit 21 and into the manifold 23. The parts of the device being in the position shown in Figure 3, the ports 24 and 40 will be in registry; therefore, the fluid will flow through said ports, through the core provided in the piston 56, through the ports 61 and 36 of the piston and sleeve respectively, and through the port 33 into the conduit 15 communicating with the measuring chamber 11. Assuming then that the measuring chamber 10 has already been filled, fluid from said measuring chamber will discharge through the conduit 14, through the ports 34 and 37, and through the passage 57 of the piston, and through the ports 59 and 17 to the discharge hose connections.

When the cylinder 11 has been filled, fluid is prevented from passing through the air connections 13 by any suitable valve means provided within the chamber 11, and a back pressure will accordingly be built up in the casing 16 of the control unit. This back pressure will act on the bottom of the piston 56 and when sufficient pressure has been built up, will cause the piston 56 to move upwardly, moving the port 61 out of registry with the port 36 and the discharge passage 57 out of registry with the ports 37 and 34. The piston 56 in moving upwardly moves the piston rod 65 with it, causing the spring 75 to be compressed between the shoulder 78 of the member 66 and the spider 42. Cam 69 will come in contact with the pin 52 and will operate thereon to move the dog 46 out of engagement with the shoulder 44 of the rod 43, and the compresison of the spring will cause the sleeve to move positively upward, moving the port 40 out of registry with the port 24, cutting off communication of the ports 24 and 28 and causing the ports 41 and 25 to come into register. In this position, the dog 47 will act to lock the sleeve in upward position by engagement with shoulder 45.

It will then be understood that fluid will be pumped through the conduit 21, through the manifold 23, through ports 25 and 41, through core 64 in the piston, through the ports 62, 37 and 34, and through the conduit 14 to the measuring chamber 10. The fluid already measured in the measuring chamber 11 will pass through the conduit, 15, through ports 33 and 36, through the core 58 and the port 60 and out through the discharge port 17 to the discharge mechanism, and it will readily be understood that any excess fluid trapped in the bottom of the casing 16 due to the pressure necessary to move the parts of the valve, will pass through the port 27, which has been uncovered by the upward movement of the sleeve, into the discharge manifold 26 and through the conduit 22 to the source of supply.

It will readily be appreciated that when the measuring chamber 10 has been filled, a reverse movement similar to that just described will be effected; that is, pressure will be built up in the top of the casing 16, moving the piston downwardly, cutting off communication between the core 58 and the ports 36 and 33, and bringing the core 57 into registry with the ports 37 and 34. A spring 76 will be compressed between the spider 42 and the boss 77, and the cam 70 will contact the pin 53 of the dog 47 which has been in engagement with the shoulder 45, moving said dog out of engagement with said shoulder and allowing the spring 76 to move the sleeve downwardly into that position shown in Figure 3 and as already described. In this position, dog 46 will lock the sleeve in lowered position by engagement with shoulder 44, in which position the port 28 will be uncovered allowing any excess accumulation of fluid to drain back to the source through the conduit 22. Dogs 71 are provided to engage in the notches 67 and 68 in order to hold the piston in the correct positions of operation so that there will always be a positive registry of the ports and the parts of the unit will not move until and unless the correct pressure has been built, thereby insuring that the correct charging and correct supply and discharging of the measuring chambers is effected.

We do not wish to be limited by the exact embodiment of the device shown, which is merely by way of illustration and not by way of limitation, as other and various forms of the device will of course readily occur to those skilled in the art.

We claim:

1. In fluid dispensing apparatus, the combination of measuring means, supply and discharge means associated therewith, and telescoping pressure actuated reciprocating members comprising means for controlling the flow of fluid to said before mentioned means.

2. In fluid dispensing apparatus, the combination of measuring means, supply and discharge means associated therewith, and self-contained means associated with the above means for controlling flow of fluid to and from same, said control means including telescoping pressure actuated members for controlling the flow of fluid in said apparatus, said members having means for directing and controlling the fluid flow.

3. In fluid dispensing apparatus, the combination of measuring means, supply means therefor, and a self-contained self-actuated fluid control unit connecting said measuring means and supply means, said control unit including sleeve and piston valve means for controlling the fluid supply, said last named means being pressure controlled.

4. In a fluid dispensing apparatus, the combination of measuring chambers, means for supplying fluid to said measuring chambers, and means for controlling the flow of fluid to and the discharge of fluid from said measuring chambers, said last named means including sleeve and piston members for effecting alternate and simultaneous filling and discharge of said chambers.

5. In a fluid dispensing apparatus, the combination of measuring chambers, means for supplying fluid to said measuring chambers, and means for controlling the flow of fluid to and the discharge of fluid from said measuring chambers, said last named means including sleeve and piston members for automatically effecting alternate and simultaneous filling and discharge of said chambers.

6. Control means for fluid dispensing apparatus including pressure responsive rectilinearly reciprocating members slidable on each other, one of said members having means for controlling the operation of another of said members.

7. Control means for fluid dispensing apparatus including pressure responsive reciprocating members slidable on each other, one of said members having means for controlling the operation of another of said members, and means cooperating with said members for maintaining said members in operative position and relation.

8. Control means for fluid dispensing apparatus including a housing operatively connected to measuring chambers and to the supply means therefor of said apparatus, and pressure responsive concentric reciprocating means in said housing for effecting the simultaneous and alternate discharge and supply of fluid of said chambers.

9. Control means for fluid dispensing apparatus including a housing operatively connected to measuring chambers and to the supply means therefor of said apparatus, and a pair of pressure responsive concentric cooperating reciprocating members in said housing for effecting the simultaneous and alternate discharge and supply of fluid of said chambers.

10. Control means for fluid dispensing apparatus including a housing operatively connected to measuring chambers and to the supply means therefor of said apparatus, a pair of pressure responsive concentric cooperating reciprocating members in said housing for effecting the simultaneous and alternate discharge and supply of fluid of said chambers, and means cooperating with said members for maintaining said members in operative position and relation.

11. Control means for fluid dispensing apparatus including a housing operatively connected to measuring chambers and to the supply means therefor of said apparatus, and a pair of pressure responsive cooperating reciprocating members in said housing for effecting the simultaneous and alternate discharge and supply of fluid of said chambers, said members having ports cooperating with ports in the supply and discharge lines of the apparatus for controlling the said discharge and supply of fluid.

12. In liquid dispensing apparatus, the combination of measuring means, supply means therefor, means between said first two mentioned means for directing supply to and discharge from said first named means, said third named means including concentric reciprocating members.

13. In liquid dispensing apparatus, the combination of measuring means, supply means therefor, means between said first two mentioned means for directing supply to and discharge from said first named means, said third named means including normally latched reciprocating members, one of said members having means for positively moving another of said members.

14. In liquid dispensing apparatus, the combination of measuring means, supply means therefor, means between said first two mentioned means for directing supply to and discharge from said first named means, said third named means including normally latched reciprocating members, one of said members having means for unlatching the other of said members.

15. In liquid dispensing apparatus, the combination of measuring chambers, supply to and return from said chambers, discharge means, means for controlling supply, return and discharge, said means including a member connected to said chambers and said discharge and having a plurality of ports communicating with said supply and return, and means for controlling said supply, discharge and return, said means including normally latched members.

16. In liquid dispensing apparatus, the combination of measuring chambers, supply to and return from said chambers, discharge means, means for controlling supply, return and discharge, said means including a member connected to said chambers and said discharge and having a plurality of ports communicating with said supply and return, means for controlling said supply, discharge and return, said means including a ported sleeve, and a ported member reciprocating in said sleeve.

Signed at Rochester, Pennsylvania, this 18th day of August, 1927.

LEO DEUTSCH.
GEORGE J. GENUNG.